March 30, 1965

L. PÉRAS 3,175,413

SYNCHROMESH DEVICES FOR SLIDING GEARS

Filed June 22, 1962

March 30, 1965 — L. PÉRAS — 3,175,413
SYNCHROMESH DEVICES FOR SLIDING GEARS
Filed June 22, 1962 — 2 Sheets-Sheet 2

# United States Patent Office 3,175,413
Patented Mar. 30, 1965

3,175,413
SYNCHROMESH DEVICES FOR SLIDING GEARS
Lucien Péras, Billancourt, France, assignor to Regie
Nationale des Usines Renault, Billancourt, France
Filed June 22, 1962, Ser. No. 204,469
Claims priority, application France, June 30, 1961,
866,685, Patent 1,313,752
4 Claims. (Cl. 74—339)

This invention relates to the synchronization, before the dog engagement, of a sliding gear in a gearbox.

In gearbox construction the term "sliding gear" applies in general to a pinion adapted through an axial displacement to be drivingly connected by turns under suitable control means with gears carried by another shaft to give the desired transmission ratios.

In vehicle transmissions of gearboxes this arrangement is most popular for first speed and reverse.

It is the object of this invention to provide a sliding gear synchromesh device wherein a synchromesh ring prepares the dog engagement of the inner splines of a sliding gear with a circular set of dogs. The dogs are bevelled and register with the sliding gear; they are carried by a hub on which said sliding gear is slidably mounted and free to rotate in its disengaged axial position.

The synchromesh ring carries an inner set of teeth bevelled on the dog side and conjugated therewith. In the inoperative position the synchromesh ring is urged by a spring toward the sliding gear on an end position of which the ring teeth and the dogs just contact each other through the homologous ramps or cam faces of their bevelled portions. The engagement takes place when the sliding gear and the synchromesh ring contact each other in the conventional manner through their tapered friction faces, the aforesaid ramps or cam faces of their bevelled portions having the safety or preventer function well known in devices of this character.

When the sliding gear has attained the hub speed, it moves towards the dogs and compresses the aforesaid spring while moving back the synchromesh ring of which the teeth engage the bottom of the dogs. The splines of the sliding gear follow this movement and engage likewise the dogs, thus providing the desired coupling.

According to the preferred arrangement of this invention, the spring is of the spiral coil type with convolutions of gradually decreasing diameter whereby these convolutions may fit into one another when the spring is compressed home. The spring and the synchromesh ring are mounted in a case secured on a flange rigid with the hub.

Of course, this pre-synchronized dog device may be used either for a single speed change, that is, with a single set of dogs mounted on the hub, or for two speeds, the dogs being divided in this case into two annuli at the two ends of the hub, according to a symmetrical arrangement.

One of these typical forms of embodiment of the invention, as applied to a synchromesh dog clutch device for the first or low gear only through a sliding gear also adapted to engage the reverse but through non-synchronized dogs, will now be described by way of example with reference to the accompanying drawing, in which.

Figure 1:
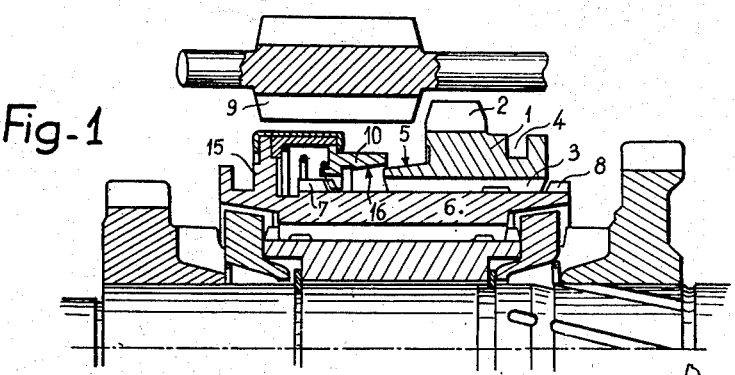
FIGURE 1 is an axial section showing one section of a gearbox incorporating the device of this invention.

The gearbox assembly shown in FIG. 1 comprises a sliding gear 1 formed with meshing teeth 2 and inner splines or dogs 3, a groove 4 for receiving the gear control fork (not shown) and a tapered friction surface or cone 5 adapted, for synchronizing purposes, to cooperate with the homologous surface 16 of a synchromesh ring 18 to be described presently.

The sliding gear 1 adapted to slide axially on its hub 6 is free to revolve thereon in the axial portion available between the first-speed dogs 7 and the reverse dogs 8.

The first-speed pinion 9 associated with the sliding gear is formed with teeth of a width calculated to permit the meshing engagement with the teeth 2 along a few millimeters (measured from the teeth inlets) before the cones 5 and 16 engage each other, that is, before the synchronization and dog engagement.

Figure 2:
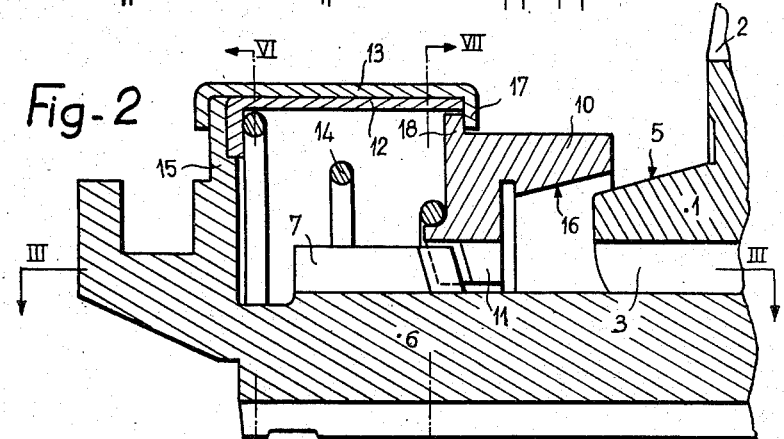
FIGURE 2 is a fragmentary view showing on a larger scale the synchromesh dog clutch in its disengaged condition.
Figure 3:
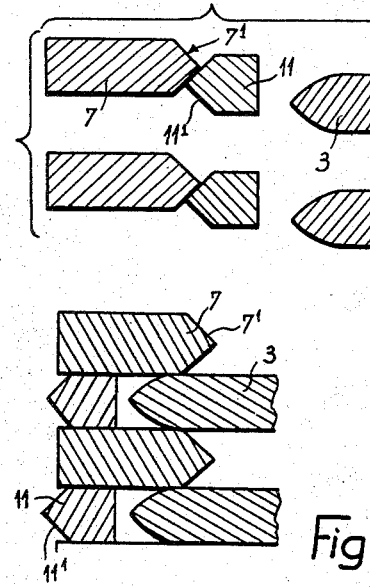
FIGURE 3 is a section showing the same component elements at the teeth level in the form of a developed cylinder as taken upon the line III—III of FIG. 2.
Figure 4:
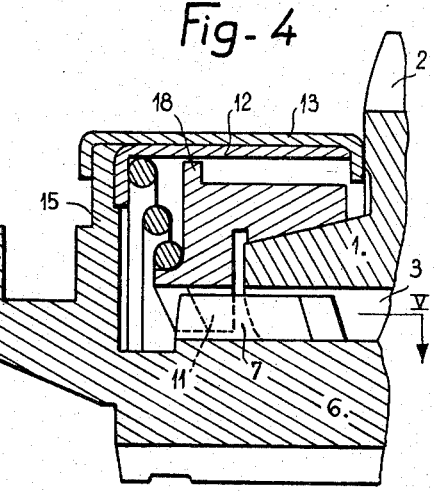
FIGURE 4 illustrates the elements of FIG. 1 but in the engaged position.

The synchromesh ring 10 is formed with an inner set of teeth 11 (see FIGS. 2 and 3) having bevelled teeth inlets $11^1$ kept in the relative position shown in these figures with respect to the similarly bevelled inlets $7^1$ of the dog teeth 7 by an outer case consisting of a spacer 12 covered by a sheet-metal collar 13 crimped over the flange 15 rigid with the hub 6.

The edge of collar 13 which is opposite to this flange 15 is crimped over the spacer 12 so as to project slightly beyond the bore of this spacer to retain the shoulder 18 of ring 10 urged by a spiral coil spring 14, the convolutions of this spring surrounding the hub 6.

The compression stress of spring 14 is just sufficient to keep the ring shoulder 18 pressed against the flanged edge 17 of collar 13 and restore same to this position when, after the ring has been moved over the dogs 7 by the sliding gear 1, it is released by the same gear.

Moreover, this spring is also subjected to a spiral torsion; to this end the spring ends are bent and engage the one a notch 19 formed in the flange 15 of the hub 6 and the other an orifice 20 formed in the ring 10; the torsional pre-stress is provided when assembling the parts by shifting the spring ends angularly, the ring being rotated through a certain number of steps prior to its engagement on the dogs. Upon completion of the crimping operation of the collar 13, the ring is definitely engaged in the dogs and can only move angularly to the extent permitted by the gaps available between the bevelled dog inlets.

The torsional pre-stress of the spring given in the proper direction will constantly urge the same inlet sides of dogs 7 and 11 against each other. The selected sides are those becoming effective for example when synchronizing the transmission for changing from second or intermediate speed to first speed.

This device operates as follows:

The vehicle is assumed to be in motion with the gear selector having just been moved from the second speed position. The sliding gear 1 is moved to the left, as seen in the drawing, to engage the first speed.

In the neutral position, the sliding gear is free to rotate on its hub and revolves only by inertia and also as a function of the driving frictional contact of the hub and the retarding friction caused by the gearbox lubricant.

During their axial movement the teeth 2 of sliding gear 1 will firstly engage the teeth of pinion 9. Thus, gear 1 is driven at the corresponding speed. This meshing engagement takes place very easily, as the inertia of sliding gear 1 is very moderate and as the teeth inlets of this gear correspond to those of the conjugated pinion 9.

As the axial movement of sliding gear 1 proceeds the latter contacts the meshing ring 10 through cone 5.

The ring 10 bears against the inlets of the oblique dogs $7^1$ and $11^1$, and being rotatably driven from the hub 6 it engages by friction with its face 16 the cone 5 of sliding gear 1 which cannot continue its axial movement, according to the well known principle of safety synchromesh devices, as long as the hub and sliding gear revolve at different speeds.

When the speeds are synchronized the ring 10 engages with its dogs 11 the dogs 7 as it is urged by the sliding gear 1 of which the splines 3 engage in turn the same dogs and revolve as one therewith.

The gear change is thus completed.

When the sliding gear is returned to its neutral position the synchromesh ring also resumes its initial position under the influence of its spring so as to be ready for the next change from second or intermediate speed to first speed.

Figure 5:
FIGURE 5 illustrates like FIG. 3 a developed section of the component elements of FIG. 4 as taken upon the line V—V of FIG. 4.
Figure 6:
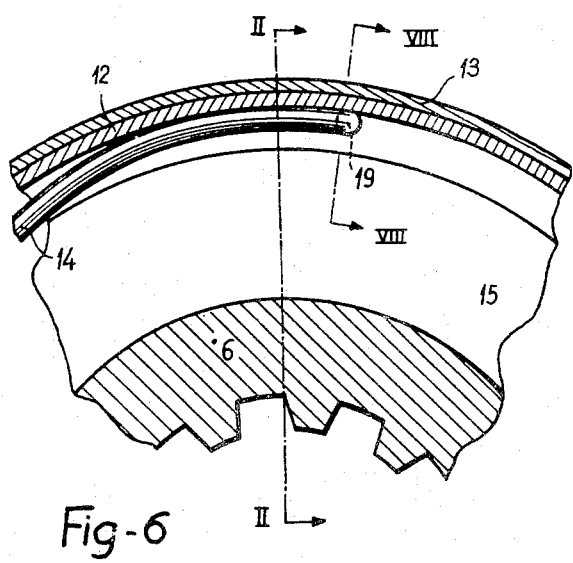
FIGURES 6 and 7 are fragmentary sections at a large scale of the device according to the invention along lines VI—VI and VII—VII of FIGURE 2.
Figure 8:
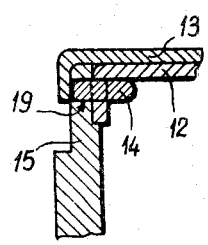
FIGURE 8 is a fragmentary section of a part of said device along line VIII—VIII of FIGURE 6.
Figure 7:
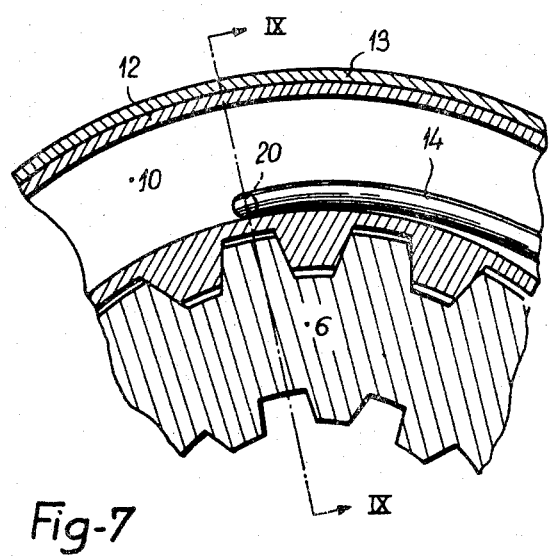
Figure 9:
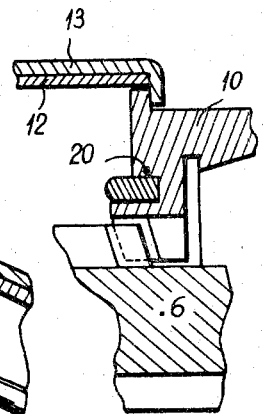
FIGURE 9 is a fragmentary section of a part of said device along line IX—IX of FIGURE 7.

When the vehicle is still, the first speed is engaged without difficulty; in fact, the locking or safety ramps receive only axial stress, the spring action being negligible and the ring is directed accordingly so as to engage the dogs, and the ramps are perfectly released therefrom when the splines 3 of the sliding gear engage the dogs 7 of the hub (FIG. 5). Therefore, nothing interferes with the complete engagement of the sliding gear when the vehicle is not running.

Although the above description and the attached drawing refer only to one form of embodiment of the invention, it will be readily understood by anybody conversant with the art that many modifications and variations may be resorted to without departing from the spirit and scope of the invention as set forth in the appended claims.

I claim:

1. Safety synchromesh device for the coupling of a hub to a rotating shaft comprising, on one hand, a gear slidable from a neutral position to a coupling position on said hub and mounted on the latter for free rotation in its neutral position and having an outer set of teeth and an inner set of splines engaging respectively the teeth of a pinion carried by said shaft and a set of dogs with bevelled inlet ends carried by said hub when said gear moves to the position where it operates said coupling, said gear having a frictional conical surface on its side towards its coupling position, said safety synchromesh device comprising on the other hand, between said set of dogs and said gear, a synchromesh ring having a frictional conical portion adapted to cooperate with the conical surface of said gear and having teeth with bevelled end ramps, means being provided on the hub to lock said bevelled ramps against said bevelled inlet ends of the set of dogs carried by the hub, said means being released when said gear being caused to move to its coupling position and having meshed said pinion is brought into synchronism with said ring, whereby the teeth of said ring and then the inner set of splines of said gear mesh the set of dogs of said hub.

2. Safety synchromesh device according to claim 1 wherein said hub and said ring at its side opposite to the one having said friction conical portion are provided with flanges and wherein said means for locking said bevelled ramps against said bevelled inlet ends consist of a case secured to the flange of said hub and crimped over the flange of said ring to limit its axial motion toward said gear and of a spiral coil spring urging axially said ring against the crimped edge of said case and urging radially the ramps of said ring against the bevelled ends of the dogs of said hub.

3. Safety synchromesh device according to claim 2 wherein said spiral coil spring has one end secured to the flange of said hub and its other end secured to said ring, said spring having convolutions of gradually decreasing diameter which fit into one another in the compressed condition of said spring when said safety synchromesh device is in its coupling position.

4. Device according to claim 2, characterized in that said return spring is rotatably pre-stressed about its axis to ensure in a preferred direction the driving engagement between the ring teeth and the hub dogs.

References Cited by the Examiner

FOREIGN PATENTS 694,863 8/40 Germany.
339,694 12/30 Great Britain.

DON A. WAITE, *Primary Examiner.*